United States Patent
Katari et al.

(10) Patent No.: US 10,514,956 B2
(45) Date of Patent: Dec. 24, 2019

(54) PERFORMANCE HINT DRIVEN RESOURCE ALLOCATION

(71) Applicant: QUALCOMM Incorporated, San Diego, CA (US)

(72) Inventors: Suryanarayana Raju Katari, San Diego, CA (US); Terance Wijesinghe, San Marcos, CA (US); Amir Vajid, San Diego, CA (US); Krishna Vsssr Vanka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 15/710,620

(22) Filed: Sep. 20, 2017

(65) Prior Publication Data

US 2019/0087226 A1    Mar. 21, 2019

(51) Int. Cl.
*G06F 9/46* (2006.01)
*G06F 9/50* (2006.01)
*G06F 11/34* (2006.01)

(52) U.S. Cl.
CPC .......... *G06F 9/505* (2013.01); *G06F 11/3409* (2013.01); *G06F 11/3433* (2013.01); *G06F 2201/81* (2013.01)

(58) Field of Classification Search
CPC .. G06F 9/505; G06F 11/3409; G06F 2201/81; G06F 11/3433
USPC ....................................................... 718/104
See application file for complete search history.

(56) References Cited

U.S. PATENT DOCUMENTS

| | | | |
|---|---|---|---|
| 8,584,133 B2* | 11/2013 | McAlinden | G06F 1/3203 718/104 |
| 8,767,535 B2 | 7/2014 | Uysal et al. | |
| 9,223,623 B2 | 12/2015 | Gujarathi et al. | |
| 9,364,743 B2* | 6/2016 | Miura | A63F 13/00 |
| 9,513,950 B2 | 12/2016 | Beveridge et al. | |
| 9,697,045 B2 | 7/2017 | Amaral et al. | |
| 2011/0213997 A1* | 9/2011 | Kansal | G06F 1/3203 713/324 |
| 2014/0115597 A1* | 4/2014 | Schmit | G06F 9/5044 718/104 |
| 2016/0337426 A1* | 11/2016 | Shribman | H04L 65/4084 |
| 2017/0235614 A1* | 8/2017 | Choe | G06F 9/5077 718/104 |

OTHER PUBLICATIONS

Grandhi, "On the Quality of Service of mobile cloud gaming using GamingAnywhere", 2016, Master Thesis, Blekinge Institute of Technology, Sweden, 48 pages (Year: 2016).*
Pathania et al., "Integrated CPU-GPU Power Management for 3D Mobile Games", 2014, ACM, 6 pages. (Year: 2014).*
Tsakalozos K., et al., "Hint-based Execution of Workloads in Clouds with Nefeli," IEEE Transactions on Parallel and Distributed Systems, 2013, 16 pages.

* cited by examiner

*Primary Examiner* — Ted T. Vo
(74) *Attorney, Agent, or Firm* — Procopio, Cory, Hargreaves & Savitch LLP

(57) ABSTRACT

Performance-hint-driven dynamic resource management, including: receiving workload requirements and sensor inputs of a system; determining a new allocation for resources of the system; reconfiguring the resources of the system using the new allocation; evaluating performance of the system based on the reconfigured resources of the system; and generating performance hints based on the evaluated performance of the system.

20 Claims, 3 Drawing Sheets

PERFORMANCE HINT DRIVEN RESOURCE ALLOCATION

BACKGROUND

Field

This disclosure relates generally to resource allocation, and more specifically, to the resource allocation based on performance hints.

Background

Existing resource scaling and allocation schemes rely on manually entered periodic workload evaluation and user/sensor inputs. However, these existing schemes pose limitations on effective scaling of the resources to achieve good power-performance balance. That is, either power or performance is scarified based on workload conditions.

FIG. 1 is a block diagram of one example of the existing resource scaling and allocation schemes 100. The existing resource scaling and allocation unit 130 receives workload requirements 110 and user/sensor inputs 120 to determine a new allocation 132 for the resources. Thus, the new allocation 132 is used to configure the resources 140. As the new workload requirements 110 are determined and/or new user/sensor interaction inputs 120 are sensed, the resource scaling and allocation unit 130 determines the new allocation 132 to re-configure the resources 140.

In one example gaming use case, workload patterns may differ significantly depending on how the game rendering workload is distributed among software threads. Some gaming applications handle the graphics processing unit (GPU) rendering workload primarily in a single software thread, while other applications distribute the load across several threads with inter-dependencies. However, it was observed that scaling the resources based on the past workload results in frame drops, which cause poor user experience. Accordingly, there is a need to provide effective allocation and scaling of the resources to achieve good power-performance balance.

SUMMARY

The present disclosure describes method, system, and apparatus for performance-hint-driven dynamic resource management.

In one embodiment, a performance-hint-driven dynamic resource management method is disclosed. The method includes: receiving workload requirements and sensor inputs of a system; determining a new allocation for resources of the system; reconfiguring the resources of the system using the new allocation; evaluating performance of the system based on the reconfigured resources of the system; and generating performance hints based on the evaluated performance of the system.

In another embodiment, a system for scaling and allocation of resources of a second system is disclosed. The system includes: a resource scaling and allocation unit configured to receive workload requirements and sensor inputs to determine a new allocation, wherein the new allocation is used to configure the resources of the second system; and a performance evaluation unit configured to evaluate performance of the second system based on the resources of the second system reconfigured using the new allocation, wherein the performance evaluation unit is also configured to generate performance hints based on the evaluated performance of the second system.

In another embodiment, an apparatus for scaling and allocation of resources of a system is disclosed. The apparatus includes: means for receiving workload requirements and sensor inputs of a system; means for determining a new allocation for resources of the system; means for reconfiguring the resources of the system using the new allocation; means for evaluating performance of the system based on the reconfigured resources of the system; and means for generating performance hints based on the evaluated performance of the system.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

Figure 1:
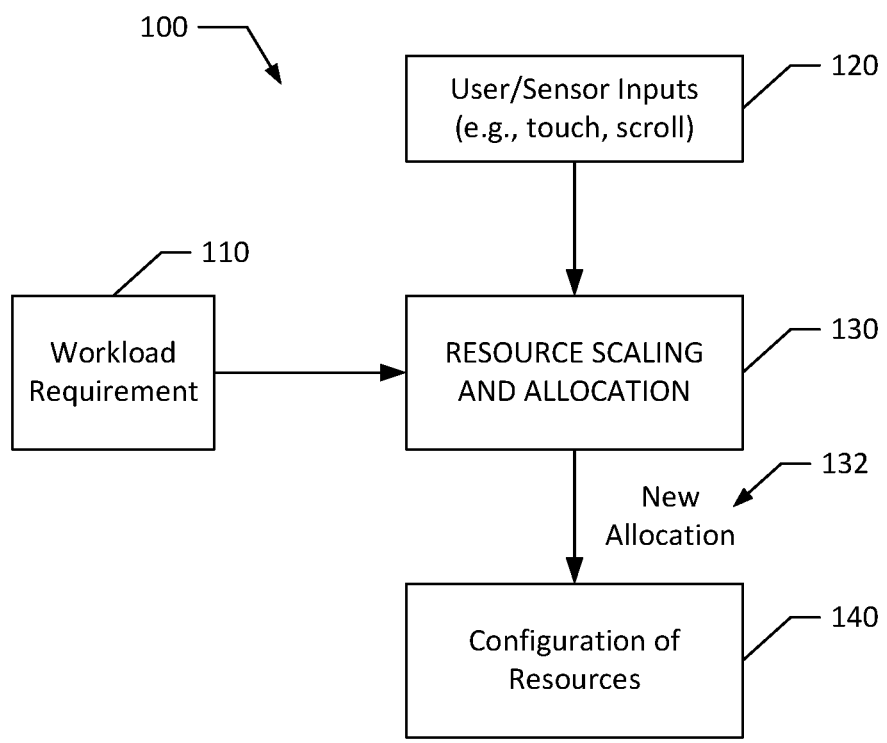
FIG. 1 is a block diagram of one example of existing resource scaling and allocation schemes.

In certain implementations of the present disclosure, in addition to relying on existing resource scaling and allocation schemes, additional performance hints are supported as a part of the solution. These performance hints can be of different forms depending on the scenario and performance requirements.

After reading this description it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, the performance hints are generated after the performance of a system is evaluated. The performance evaluation of the system is done after the resource scaling and allocation unit generates new allocations and configures the resources of the system using the new allocations.

In one example gaming use case, the game can be very distracting when the frame rate stutters and the screen tears. The stuttering occurs when the frame rates fall below the vertical synchronization (Vsync) frame rate cap, which is typically 60 frames-per-second (fps). This rate matches the 60 Hz refresh rate of most monitors and screens. When the frame rate dips below the cap, Vsync locks the frame rate to the nearest level, such as 45 or 30 fps. As performance improves, the frame rate returns to 60 fps. In performance-intensive games, this dramatic change in the frame rate can occur several times per second to cause the noticeable stuttering, which also causes eye strain and headaches.

Thus, in the gaming use case, the performance goal is to maintain rendering (and commit) frame-rate at a designed rate which is typically a display Vsync rate (i.e., 60 fps). For this performance goal, at least three possible performance hints can be generated to provide better power and performance balance. Therefore, in this case, the performance hints may include at least: (1) the rate at which the frames of a video to be displayed are rendered and queued to the compositor; (2) the rate at which the frames are committed to the display by the compositor; and (3) the time between queueing of a frame and Vsync. Based on the generated performance hints, the resource scaling and allocation unit can perform at least following steps to provide an optimum power level while maintaining good performance: (1) increase or decrease the cluster frequency of a processor; and (2) move performance critical workload between lower and higher performance processors. The term "providing an optimum power level while maintaining good performance" refers to maintaining a power-performance balance that is better than a power-performance balance achievable without the use of the performance hints. In one implementation, depending on the workload conditions, optimum power level could yield power improvement of 5% or higher.

Figure 2:
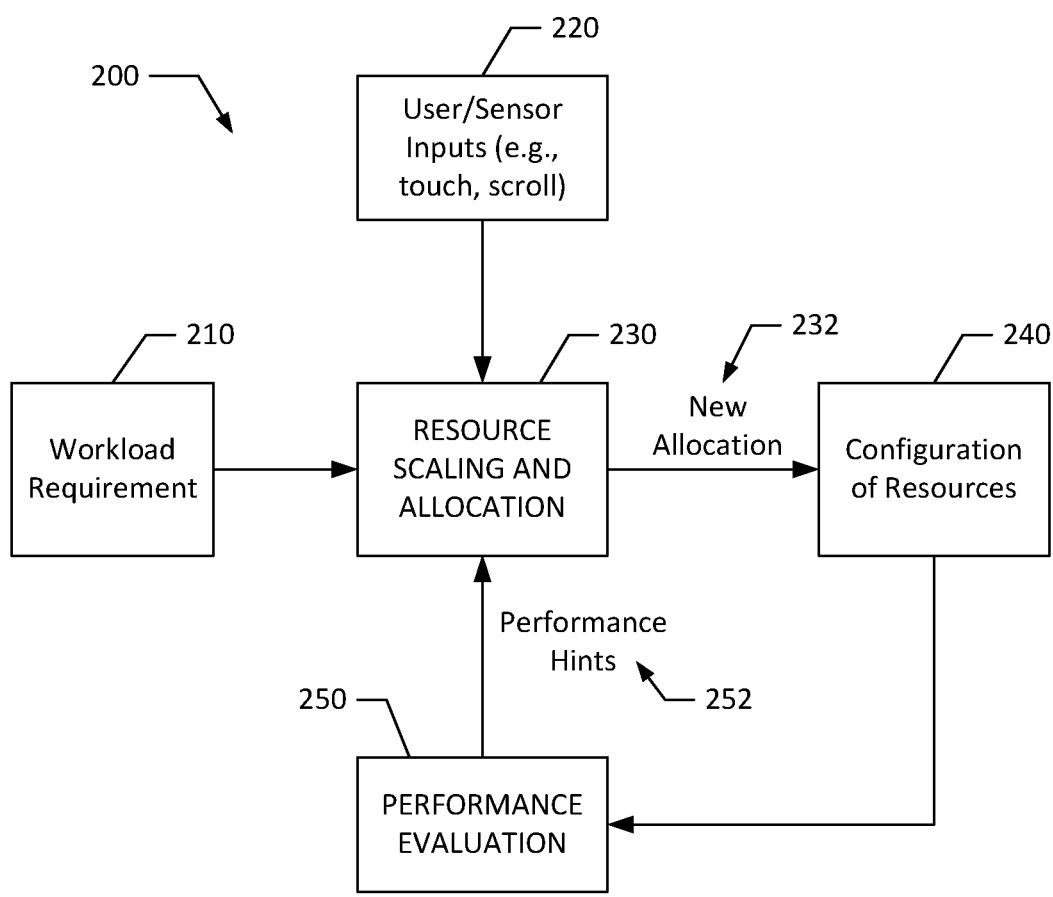
FIG. 2 is a block diagram of a resource scaling and allocation scheme for a system in accordance with one embodiment of the present disclosure.

FIG. 2 is a block diagram of a resource scaling and allocation scheme 200 for a system in accordance with one embodiment of the present disclosure. In the illustrated embodiment of FIG. 2, a resource scaling and allocation unit 230 receives a workload requirement 210 and user/sensor inputs 220 to determine a new allocation 232 for the resources. Thus, the new allocation 232 is used to configure the resources 240. As the new workload requirement 210 is determined and/or new user/sensor interaction inputs 220 are sensed, the resource scaling and allocation unit 230 determines the new allocation 232 to re-configure the resources 240 for the system.

The illustrated embodiment of FIG. 2 further includes a performance evaluation unit 250 configured to evaluate the performance of the system (e.g., a game system, virtual reality system, and/or augmented reality system) based on the resources of the system re-configured using the new allocation 232 determined by the resource scaling and allocation unit 230. Examples of the performance criteria that can be evaluated include a frames-per-second (fps) number that meets a goal and the time-to-render a frame. For a typical gaming use case, the fps number that meets the goal may be 60 fps. For scenarios where user experience is critical (e.g., touch and navigating through user-interface), the time-to-render a frame that meets the goal may be 16.6 milliseconds. The performance evaluation unit 250 is also configured to generate performance hints 252 based on the evaluated performance of the system.

In one implementation, a performance hint can be as simple as "meeting" or "not meeting" the goal. For example, using the gaming use case mentioned above, the performance hint can be "meeting the 60 fps number" or "not meeting the 60 fps number". Thus, when the performance hint indicates "not meeting the 60 fps number," the resource scaling and allocation unit 230 may allocate more resources. In another implementation, a performance hint can be more complicated. For example, using the time-to-render a frame scenario mentioned above, the performance hint can be the time left before crossing the 16.6 millisecond threshold before the frames are dropped. In this case, Thus, in one implementation, the performance hint of "the time left before crossing the 16.6 millisecond threshold before the frames are dropped" is used to decide the resource allocation. For example, a large value may indicate enough headroom to scale down the allocated resources to improve power, while a smaller value (e.g., close to zero) may indicate a need for more allocation of resources towards maintaining performance. Once the performance hints 252 are received, the resource scaling and allocation unit 230 performs steps to provide an optimum power level for the system while maintaining good performance.

As indicated above for a gaming use case in which the performance goal is to maintain the rendering frame-rate at a display Vsync rate, the performance hints 252 may include the rate at which the frames of a video to be displayed are rendered and queued to the compositor, the rate at which the frames are committed to the display by the compositor, and the time between queueing of the frame and the Vsync. The generated performance hints 252 are then sent to the resource scaling and allocation unit 230, which can perform certain steps to provide an optimum power level while maintaining good performance. The certain steps may include steps such as increase or decrease the cluster frequency of a processor and/or move performance critical workload between lower and higher performance processors.

Figure 3:
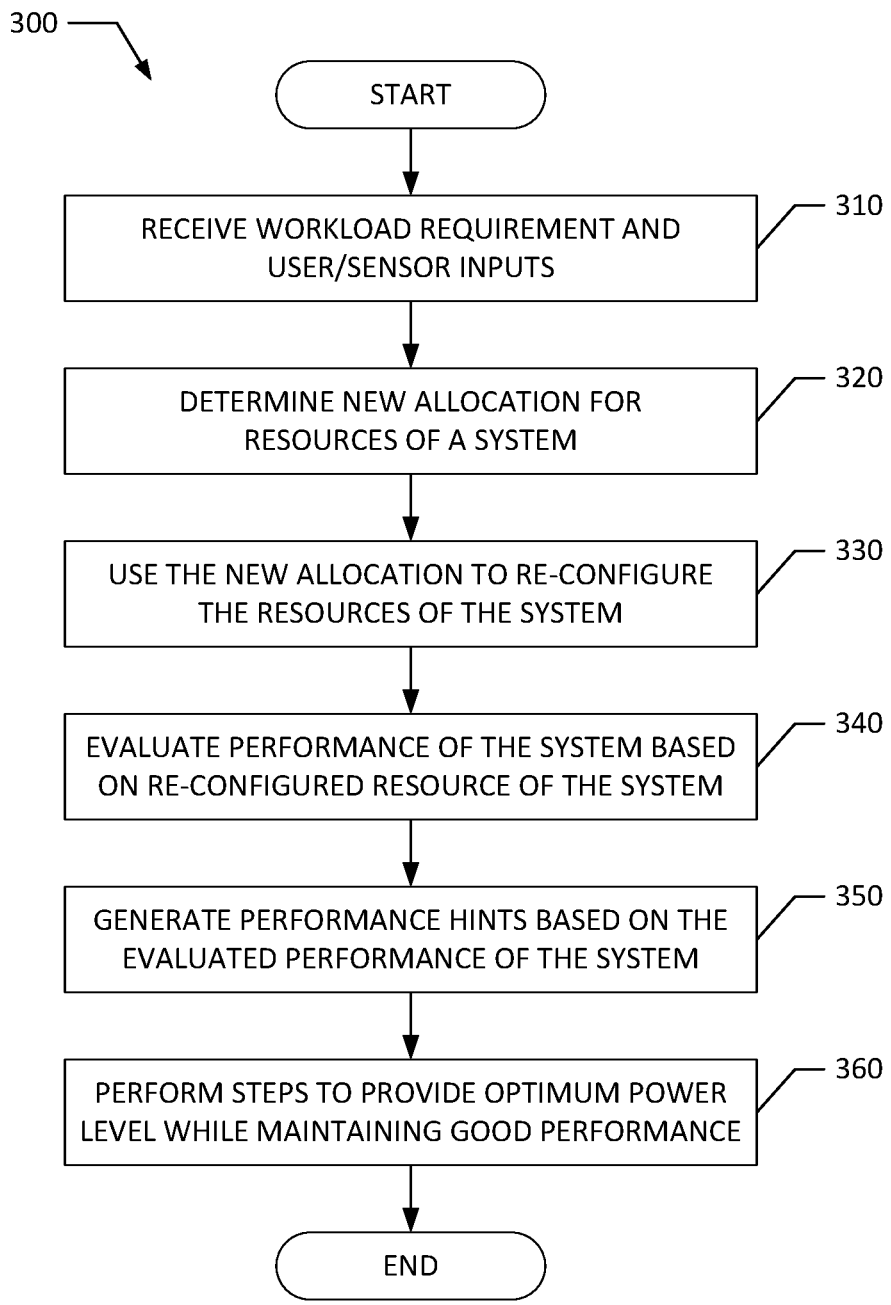
FIG. 3 is a flow diagram of a performance-hint-driven dynamic resource management process in accordance with one embodiment of the present disclosure.

FIG. 3 is a flow diagram of a performance-hint-driven dynamic resource management process 300 in accordance with one embodiment of the present disclosure. In the illustrated embodiment of FIG. 3, the workload requirements and the user/sensor inputs are received, at block 310, which are used to determine a new allocation for the resources of a system, at block 320. In one embodiment, the system is a game system. The new allocation is then used to re-configure the resources of the system, at block 330.

The illustrated embodiment of FIG. 3 further includes evaluating the performance of the system, at block 340, based on the resources of the system re-configured using the new allocation, at block 320. The performance hints are then generated, at block 350, based on the evaluated performance of the system. As stated above, for the gaming use case, the generated performance hint may include the rate at which the frames of a video to be displayed are rendered and queued to the compositor, the rate at which the frames are committed to the display by the compositor, and the time between queueing of the frame and the Vsync.

Once the performance hints are generated, at block 350, certain steps are performed, at block 360, to provide an optimum power level for the system while maintaining good performance. As stated above, for the gaming use case, the certain steps may include steps such as increase or decrease the CPU cluster frequency and/or move performance critical workload between lower and higher performance CPU processors.

In one embodiment, the ability to evaluate and/or measure the performance of a particular system is already built in to the system. That is, the system may already include mechanisms that measure and/or evaluate the performance for certain purposes. Thus, the performance evaluation may involve merely tapping into the built-in mechanism to read or deduce the evaluation measurements. In other embodiments, the evaluation of the performance (e.g., by the performance evaluation unit 250) may involve designing a new circuit to measure and/or evaluate the performance of the system given the newly-configured resources.

Those of skill in the art will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block without departing from the disclosure.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. For example, although the detailed description of the systems, apparatus, and processes for performance-hint-driven dynamic resource management included only the gaming use case, the detailed description can be applied to other use cases such as virtual reality and user experience cases. Thus, it is to be understood that the description and drawings presented herein represent presently preferred embodiments of the disclosure and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A performance-hint-driven dynamic resource management method, comprising:
   receiving workload requirements and sensor inputs of a system,
   wherein the workload requirements define a distribution of graphics rendering workload among software threads on a first processor;
   determining an allocation for resources of the system based on the workload requirements and the sensor inputs;
   reconfiguring the resources of the system using the allocation;
   evaluating performance of the system based on the reconfigured resources of the system;
   generating performance hints based on the evaluated performance of the system; and
   determining a new allocation for resources of the system based on the generated performance hints.

2. The method of claim 1, further comprising
   performing steps to provide a power-performance balance in the system that is better than a power-performance balance achievable without the use of the performance hints.

3. The method of claim 2, wherein the steps comprise increasing or decreasing a cluster frequency of the first processor.

4. The method of claim 2, wherein the steps comprise moving a performance critical workload between the first processor and a second processor, the second processor having a different performance than the first processor.

5. The method of claim 1, wherein the generated performance hints comprise a rate at which frames of a video to be displayed are rendered and queued to a compositor.

6. The method of claim 1, wherein the generated performance hints comprise a rate at which frames of a video to be displayed are committed to a display by a compositor.

7. The method of claim 1, wherein the generated performance hints comprise a time between queueing of a frame and a vertical synchronization.

8. A system for scaling and allocation of resources of a second system, the system comprising:
   a resource scaling and allocation unit configured to receive workload requirements and sensor inputs to determine an allocation based on the workload requirements and the sensor inputs,
   wherein the allocation is used to configure the resources of the second system,
   wherein the workload requirements define a distribution of rendering graphics workload among software threads on a first processor; and
   a performance evaluation unit configured to evaluate performance of the second system based on the resources of the second system reconfigured using the new allocation,
   wherein the performance evaluation unit is also configured to generate performance hints based on the evaluated performance of the second system,
   wherein a new allocation for resources of the system is determined based on the generated performance hints.

9. The system of claim 8, wherein the resource scaling and allocation unit is configured to provide a power-performance balance in the second system that is better than a power-performance balance achievable without the use of the performance hints when the performance hints are generated by the performance evaluation unit.

10. The system of claim 9, wherein the steps comprise increasing or decreasing a cluster frequency of the first processor.

11. The system of claim 9, wherein the steps comprise moving a performance critical workload between the first processor and a second processor, the second processor having a different performance than the first processor.

12. The system of claim 8, wherein the generated performance hints comprise a rate at which frames of a video to be displayed are rendered and queued to a compositor.

13. The system of claim 8, wherein the generated performance hints comprise a rate at which frames of a video to be displayed are committed to a display by a compositor.

14. The system of claim 8, wherein the generated performance hints comprise a time between queueing of frame and vertical synchronization.

15. The system of claim 8, wherein the second system is a game system.

16. The system of claim 8, wherein the second system is a virtual reality system.

17. An apparatus comprising:
   means for receiving workload requirements and sensor inputs of a system,
   wherein the workload requirements define a distribution of graphics rendering workload among software threads;
   means for determining an allocation for resources of the system based on the workload requirements and the sensor inputs;
   means for reconfiguring the resources of the system using the new allocation;
   means for evaluating performance of the system based on the reconfigured resources of the system;
   means for generating performance hints based on the evaluated performance of the system; and
   means for determining a new allocation for resources of the system based on the generated performance hints.

18. The apparatus of claim 17, wherein a power-performance balance in the system is better than a power-performance balance achievable without the use of the performance hints.

19. The apparatus of claim 18, further comprising means for increasing or decreasing a cluster frequency of a processor.

20. The apparatus of claim 18, further comprising means for moving a performance critical workload between lower and higher performance processors.

\* \* \* \* \*